March 6, 1956     F. S. GUNDERSEN     2,737,417

CONTINUOUS SPRINKLE WATERING CAN

Filed Sept. 15, 1954

INVENTOR.
F. S. Gundersen
BY Arthur H. Sturges
Attorney

2,737,417

CONTINUOUS SPRINKLE WATERING CAN

Frank S. Gundersen, Omaha, Nebr.

Application September 15, 1954, Serial No. 456,246

6 Claims. (Cl. 299—102)

This invention relates to horticulture and particularly watering devices for sprinkling plants in a garden where a hose is not desirable, such as with very delicate or small plants, and in particular a watering can having a feeder or supply hose with a valve therein extended downwardly into the lower part whereby a continuous supply of water is provided in the can as water is sprinkled therefrom upon plants or the like.

The purpose of this invention is to provide means for maintaining a small amount of water in the bottom of a watering can so that a slow soft sprinkle, that is particularly adapted for small weak plants, may be provided.

In numerous instances, and particularly in watering small and tender varieties of plants, a fine spray from a hose, and also a spray from a large watering can bends the thin stems of the plants over, sometimes embedding the leaves in the soil, and consequently, the growth of the plants is retarded. In growing plants for commercial use it is necessary to have plants with straight stems and where the stems are bent or broken by the force of the water it is necessary to remove and replace the plants.

With this thought in mind this invention contemplates a small watering can having a spray head on the end of a spout with a tubular handle that extends downwardly on the inside of the can and through which water may be supplied to the can as the can is used, and in which means is provided for controlling the amount of water supplied so that only a comparatively small amount of water remains in the can.

The object of this invention is, therefore, to provide means for maintaining a small amount of water in a watering can as the can is used for sprinkling water upon small plants and the like.

Another object of the invention is to provide control means in a tube for supplying water to a watering can as the can is used whereby only a comparatively small quantity of water remains in the bottom of the can during use thereof.

Another important object of the invention is to provide a watering can for sprinkling small plants in which water is supplied continuously through a hose or the like in which the can is provided with a tubular handle to which the hose is connected so that it is not necessary to have a separate hose hanging over a side of the can.

A further object of the invention is to provide a watering can for sprinkling small plants in which means is provided for maintaining a small quantity of water continuously as water is sprayed from the can so that it is not necessary to carry a heavy can filled with water from a water supply station to plants to be sprayed.

A still further object is to provide regulating means in a tube for supplying a continuous quantity of water to a watering can whereby the flow of water to the can is controlled to correspond with the water pressure of a community in which the can is used.

And a still further object is to provide a watering can with means for providing a continuous supply of water therein in which the can is of a simple and economical construction.

With these and other objects and advantages in view the invention embodies a watering can having a spout with a spray nozzle threaded on an enlarged portion on the extended end, with a shield and a substantially semi-circular handle on the upper end, and having a U-shaped tube secured by brackets to the side opposite to the side from which the spout extends, said tube being spaced from the outer surface of the can to provide a handle and having a hose coupling connection on the lower end and a valve in the upper part whereby with one portion extended downwardly into the can the flow of water therethrough to the can is adapted to be controlled and a relatively small quantity of water may be maintained in the can as plants are sprinkled with the can.

Other features and advantages of the invention will appear from the following description taken in connection with the drawings, wherein.

Figure 1:
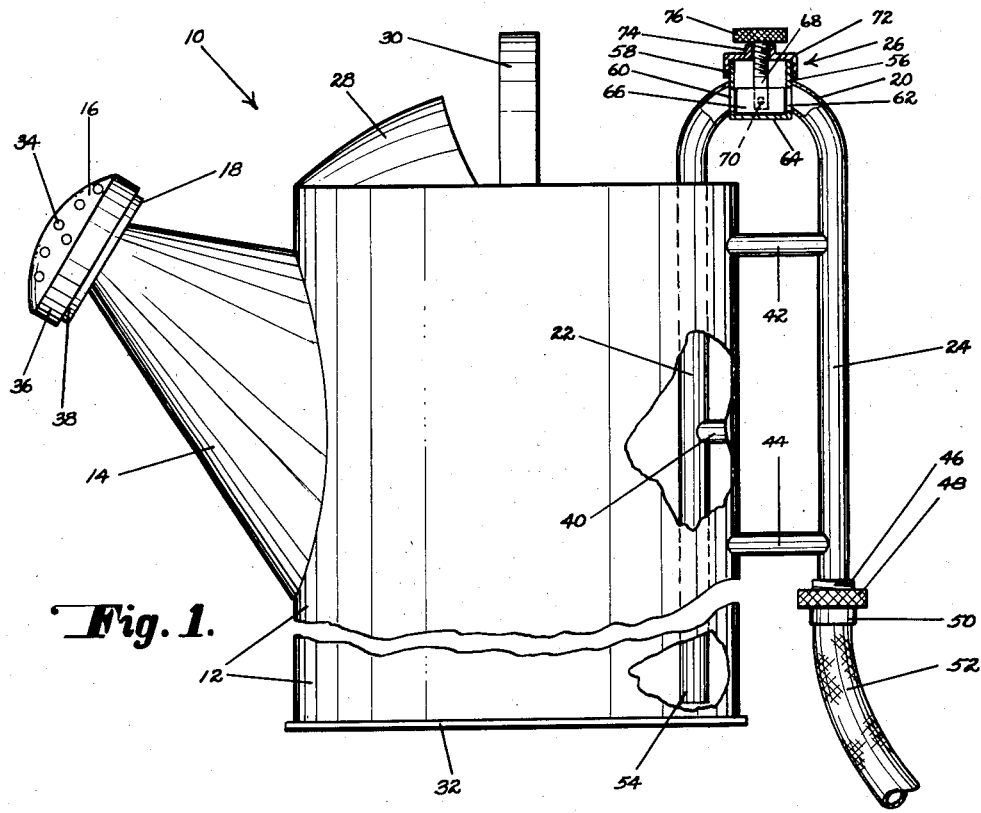
Figure 1 is a side elevational view of the improved watering can illustrating the hose connection thereto, parts of the can and connection being broken away.
Figure 2:
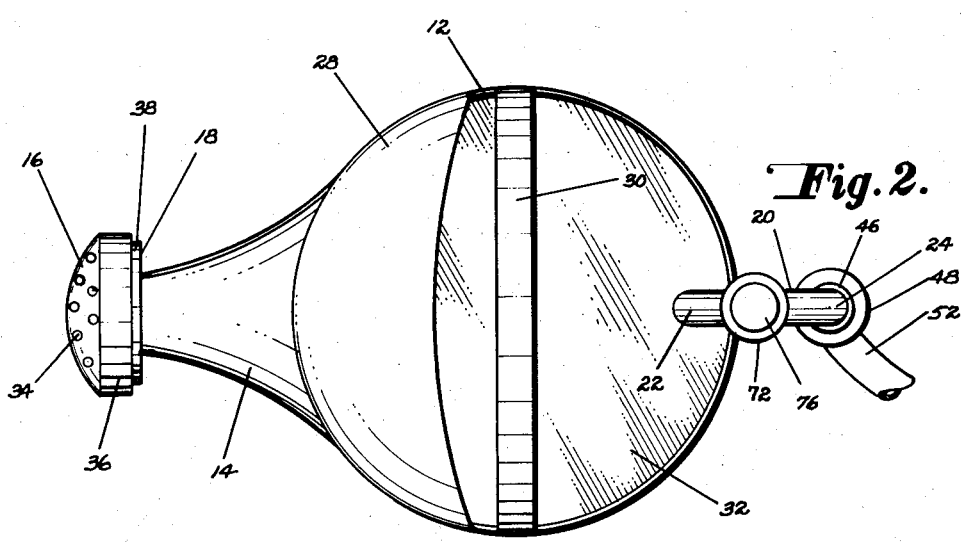
Figure 2 is a plan view of the improved watering can.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a watering can having a cylindrical body, numeral 14 a spout extended from one side of the body and having a spray head 16 threaded on an enlarged cup-shaped portion 18 on the extended end thereof, numeral 20 an inverted U-shaped tube having an inner leg 22, and an outer leg 24 positioned over one side of the body, numeral 26 a valve positioned in the tube, numeral 28 a shield positioned on the upper end of the body and adjacent the spout, and numeral 30 a substantially semi-circular handle positioned on the upper end of the body.

The body 12 is provided with a bottom 32 that is crimped or otherwise sealed in the lower end, and the head 16 which is provided with relatively fine perforations 34 is formed with a threaded flange 36 that is threaded on a similar flange 38 of the cup-shaped portion 18 at the end of the spout. By this means the head may readily be secured to the end of the spout and the head may also be readily removed for cleaning.

The inner leg 22 of the tube 20 is secured to the inner surface of the wall of the body 12 with a bracket 40 and the outer leg 24 is secured to the outer surface with brackets 42 and 44. The brackets are secured to the wall of the body and legs of the tube by welding or other suitable means.

The lower end of the outer leg 24 of the tube 20 is provided with a threaded collar 46 upon which a coupling nut 48 on a collar 50 of a hose 52 is threaded for connecting the tube of the can to a hose extended from a tap or other source of water supply and, as shown in Figure 1, the lower end of the inner leg 22 extends downwardly to a point 54 whereby it is spaced from the bottom of the can a sufficient distance to prevent splashing.

The valve 26 is formed with a cup-shaped body 56 having a threaded upper end 58, and the sides are provided with openings 60 and 62 from which the legs 22 and 24 of the tube 20 extend. The valve body is provided with a base 64 and, as shown in Figure 1, a valve element 66, which is secured to the lower end of a threaded valve stem 68 by a pin 70, is adapted to be positioned to close the openings 60 and 62, or to regulate the flow of water through the openings and tube whereby only a small quantity of water may be maintained in the body of the can. The valve body is provided with a cap 72 that is threaded on the upper end and the cap is provided with an internally threaded boss 74 in which the valve stem is threaded. The outer end of the valve stem is provided with a disc 76 having a knurled outer surface and the position of the valve element 66 is adjusted by turning the disc.

By this means a small quantity of water, such as a quart, may be maintained in the watering can as the can is used for sprinkling small plants and the like, and by using a small quantity of water the necessity of carrying a large can full of water is obviated and the possibility of bending or breaking small and tender plants with heavy streams of water is eliminated.

With the valve in the tube controlling the quantity of water in the can very fine and weak streams of water may be sprinkled from the spray head and with the handle on the upper end of the can held in one hand and the tubular handle with the other the direction of the spray is adapted to be accurately controlled.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. A watering can comprising a hollow body having a spout on one side and a tubular handle on the opposite side, the upper end of the body being open, a spray head on the extended end of the spout, and a tube extended from the upper end of the handle into the lower part of the body of the can, the lower end of the handle being adapted to be connected to a source of water supply.

2. A watering can comprising a hollow cylindrical body having a spout on one side and a tubular handle on the opposite side, the upper end of said body being open, a perforated spray head on the extended end of the spout, and a tube extended from the upper end of the handle over the upper edge of the body and downwardly in the body to a point spaced from the lower end thereof, the lower end of said handle being adapted to be connected to a source of water supply.

3. A watering can comprising a container having a spout extended from one side and an inverted U-shaped tube positioned over the opposite side, said tube being spaced from and connected to the wall of the container providing a handle, and means for connecting an end of the tube positioned on the outside of the container to a source of water supply, the opposite end of the tube being positioned in the container and extended downwardly to a point spaced from the lower end thereof, means for controlling the flow of water through the tube extended from the upper end of the handle, and said spout having spraying means on the extended end thereof.

4. A watering can comprising a container having a spout extended from one side and an inverted U-shaped tube positioned over the opposite side, said tube being spaced from and secured to the wall of the container, said tube being positioned to provide a handle, a manually actuated valve positioned in said tube, means for connecting the end of the tube at the lower end of the handle to a source of water supply, and a spray nozzle on the extended end of said spout.

5. In a continuous spray watering can, the combination which comprises a hollow cylindrical body having a spout extended from one side, a shield and a handle on the upper end, and an inverted U-shaped tube positioned over the side opposite to that from which the spout extends, said tube having a leg extended downwardly into the can to a point spaced from the lower end and a leg on the outside and spaced from the outer surface of the can for providing a handle, the lower end of the leg of the tube on the outside of the can being adapted to be connected to a hose extended from a source of water supply, means for securing the tube to the can, a manually actuated valve in said tube, and a perforated spray head on the extended end of the spout.

6. In a continuous spray watering can, the combination which comprises a hollow cylindrical body having a spout extended from one side, a shield and a handle on the upper end, and an inverted U-shaped tube positioned over and secured to the side opposite to the side from which the spout extends, said tube having an inner leg extended downwardly into the body to a point spaced from the lower end and an outer leg extended downwardly on the outside of the body providing a handle, means for connecting the lower end of the outer leg to a hose extended from a source of water supply, a manually adjustable valve positioned in said tube for controlling the quantity of water in the body, said spout having an enlarged cup-shaped portion on the extended end, and a perforated spray head threaded on said cup-shaped portion.

References Cited in the file of this patent

UNITED STATES PATENTS

| | | |
|---|---|---|
| 756,190 | Tracey | Mar. 29, 1904 |
| 2,119,906 | Dorman | June 7, 1938 |